United States Patent
Hegler

(10) Patent No.: US 6,457,965 B1
(45) Date of Patent: Oct. 1, 2002

(54) APPARATUS FOR THE MANUFACTURE OF CORRUGATED PLASTIC PIPES

(76) Inventor: Ralph Peter Hegler, Schillerstrasse 7, D-97688 Bad Kissingen (DE)

( * ) Notice: Subject to any disclaimer, the term of this patent is extended or adjusted under 35 U.S.C. 154(b) by 0 days.

(21) Appl. No.: 09/565,980

(22) Filed: May 4, 2000

(30) Foreign Application Priority Data

May 18, 1999 (DE) .......................................... 199 22 726

(51) Int. Cl.[7] .............................................. B29C 49/04
(52) U.S. Cl. .................... 425/233; 425/326.1; 425/336; 425/388; 425/392; 425/395; 425/396
(58) Field of Search .............................. 425/192 R, 195, 425/233, 336, 384, 388, 392, 395, 396, 360, 370; 452/326.1, 325

(56) References Cited

U.S. PATENT DOCUMENTS

| | | | |
|---|---|---|---|
| 4,492,551 A | 1/1985 | Hegler et al. ................ | 425/114 |
| 5,582,849 A | 12/1996 | Lupke ......................... | 425/392 |
| 5,744,091 A | 4/1998 | Lupke ......................... | 425/396 |
| 6,206,670 B1 * | 3/2001 | Neubauer .................... | 425/107 |

FOREIGN PATENT DOCUMENTS

| | | |
|---|---|---|
| DE | 19702647 | 2/1998 |
| EP | 0065729 | 12/1982 |
| EP | 0359089 | 3/1990 |
| WO | WO 98/32584 | * 7/1998 |

OTHER PUBLICATIONS

Plastverarbeiter 48, Jahrgang 1997 Nr. 6—"Rasante Rohre".

* cited by examiner

*Primary Examiner*—Jan H. Silbaugh
*Assistant Examiner*—Thu Khanh T. Nguyen
(74) *Attorney, Agent, or Firm*—Robert F. L. Conte; Lee, Mann, Smith McWilliams Sweeney & Ohlson

(57) ABSTRACT

An apparatus for the manufacture of corrugated plastic pipes comprises half shells. Each half shell has a base body which consists of a metal of a higher thermal conductivity and a lower specific gravity than steel and which holds a core. Provided in the core is a mold recess in which to form the corrugated pipes.

12 Claims, 4 Drawing Sheets

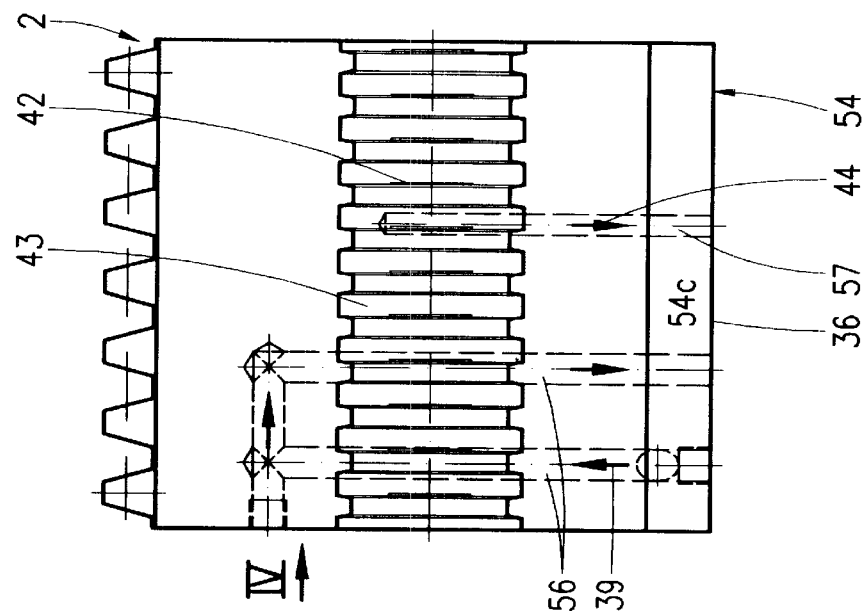
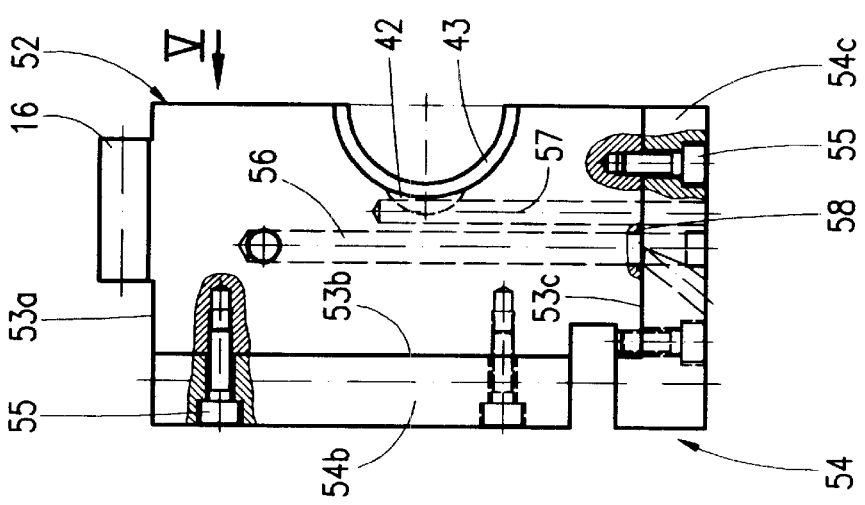

APPARATUS FOR THE MANUFACTURE OF CORRUGATED PLASTIC PIPES

BACKGROUND OF THE INVENTION

1. Field of the Invention

The invention relates to an apparatus for the manufacture of corrugated plastic pipes with cross grooves, in which half shells, which are provided with a mold recess and combine in pairs to form a mold in a molding path which runs in the direction of production, are disposed to circulate on a horizontal machine bed, which is provided with a cover plate of antifriction metal; the half shells resting by their lower bearing surfaces on the cover plate and being pressed together transversely of the direction of production by means of a guide; an extrusion head of an extruder being disposed upstream of the molding path; the half shells being provided with vacuum ducts, which are connected to the respective mold recess and which, in the molding path, open into vacuum connections formed in the machine bed; and the half shells being provided with coolant lines, which, in the molding path, open into coolant connections and coolant outlets formed in the machine bed.

2. Background Art

In an apparatus of the generic type known from U.S. Pat. No. 4,492,551, the half shells, which combine in pairs to form a mold, are displaced while sliding on a horizontal machine bed. For a sliding motion almost free from friction and wear to be attained, the machine bed has a cover plate of an antifriction metal, for instance of bronze, on which to displace the half shells of steel. Cooling water supply and discharge takes place via corresponding connections in the machine bed, the water line inlets and outlets which are formed in the half shells overlapping these connections on the molding path. The same applies to the vacuum ducts.

EP 0 359 089 B1 teaches an apparatus for the manufacture of corrugated plastic pipes, in which the half shells, which combine in pairs to form a mold, are guided on two chains which rest one on top of the other. Support elements are fixed to the chains, on which the half shells are replaceably mounted. The vacuum ducts and the cooling water lines must be guided through these support elements to the half shells. This requires extraordinarily complicated constructions. The guidance of the water lines and the vacuum ducts is complicated, which can lead to losses of cooling water and vacuum after a comparatively short operating time. Wear occurs on the parting planes between the half shells and the support elements; this can lead to a misalignment of the half shells after a short operating time and thus to increased tolerances in the corrugated pipes to be produced.

DE 197 02 647 C1 teaches an apparatus for the manufacture of corrugated plastic pipes, in which the half shells are replaceably fixed on guide and slide elements.

SUMMARY OF THE INVENTION

It is an object of the invention to embody an apparatus of the generic type so that an increase in capacity is feasible without an increase in wear at a low construction cost.

According to the invention, this object is attained by each half shell having a core, which consists of a metal of a higher thermal conductivity and a lower specific gravity than steel, in which the mold recess is formed, in which the vacuum ducts are formed at least substantially, and which is sheathed at least in the shape of an L by a base body of steel, on which the bearing surface is formed and on which rests the guide. Based on the measures according to the invention, only unimportant constructional requirements are needed to ensure that the half shells consist at least to a considerable extent of an excellently heat conducting and lightweight material. This offers the possibility of accelerating the production rate, accompanied with sufficiently good heat dissipation. No substantial wear will occur due to the fact that the guides, which press the half shells together, bear against steel and the half shells slide by their lower bearing surfaces on the cover plate of antifriction metal. The coolant and the vacuum are transferred via only one sealing and sliding surface, namely via the machine bed directly into the half shells—as in the apparatus of the generic type.

The embodiment according to which the core is at least substantially provided with a rectangular cross section with outer surfaces, on which rest inner surfaces of the base body, ensures that the core rests over its full surface in the base body, which ensures good thermal conductivity. When the base body is formed in one piece and when the base body is approximately C-shaped and holds the core, this reflects a simple design, featuring an especially stable half shell which nevertheless possesses the advantages of the invention. In particular in the case of this design, the core may have varying mold recesses; the base body may be used for cores of varying mold recesses. In this embodiment, the cooling water lines may be formed in the base body so that no problems of sealing will occur. A multi-piece, in particular two-piece design consists in that the base body is comprised of a lower plate and a plate-type vertical web and in that the base body is formed in two pieces.

The direct contact between neighboring half shells takes place via the base bodies, i.e. via the metal of greater stability, namely steel, which helps avoid wear of the core. This is especially advantageous in the embodiments according to which half shells which adjoin in the direction of production in the molding path bear against each other by their base bodies and according to which the half shells which combine in pairs to form a mold bear against each other by their base bodies in the molding path.

A particularly low-wear guide comprises guide rollers mounted by means of rolling bearings. A preferred material for the core is aluminum or an aluminum alloy. In another modified embodiment the core has a semi-cylindrical outer surface.

Further features, advantages and details of the invention will become apparent from the ensuing description of an exemplary embodiment, taken in conjunction with the drawing.

BRIEF DESCRIPTION OF THE DRAWING

FIG. 4 is a frontal view of a modified embodiment of a half shall in accordance with the arrow IV of FIG. 5

FIG. 5 is an interior view of a half shell in accordance with the arrow V of FIG. 4.

DESCRIPTION OF THE PREFERRED EMBODIMENT

Figure 1:
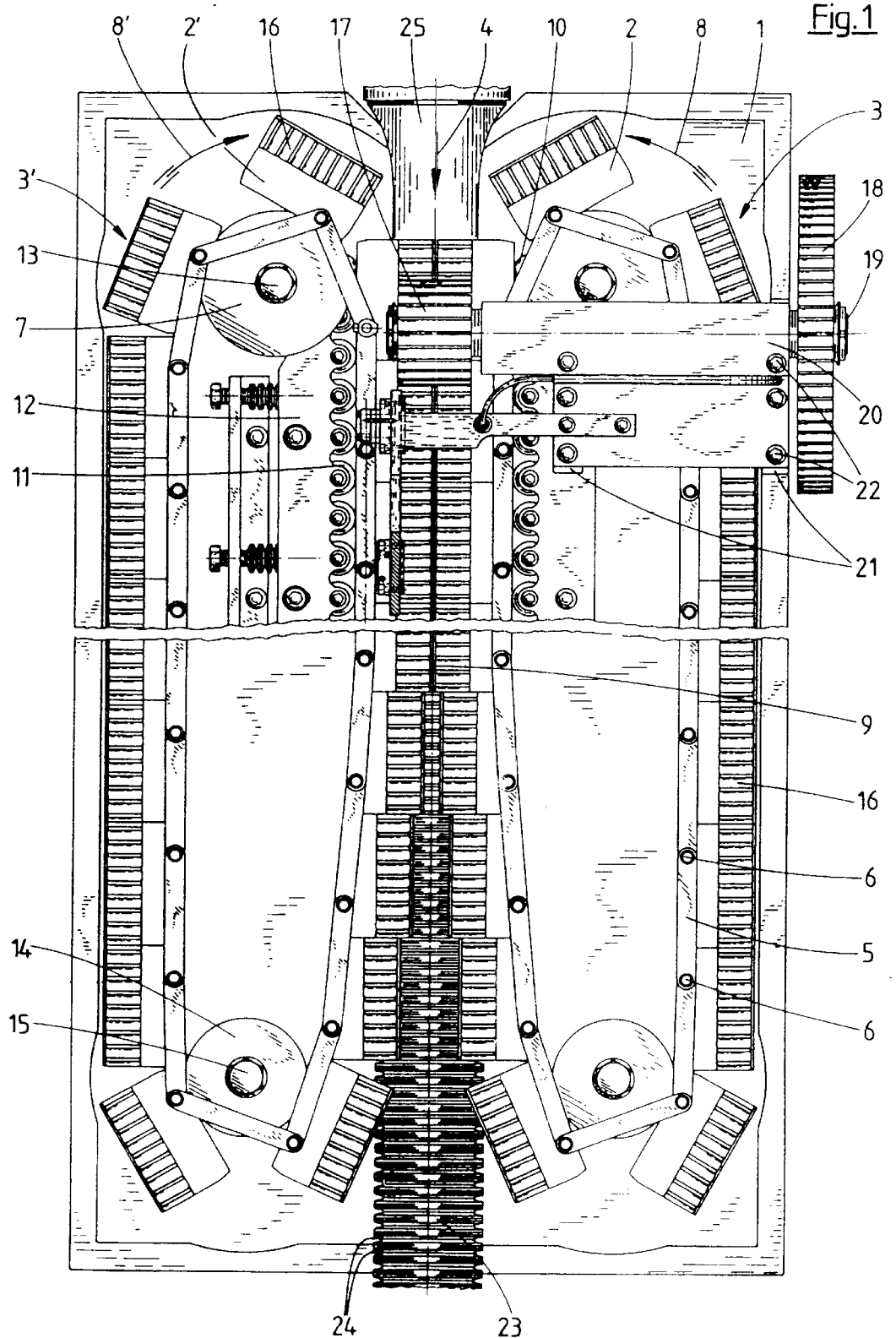
FIG. 1 is a plan view of an apparatus according to the invention.

As seen in FIG. 1, the apparatus for the manufacture of plastic pipes with cross grooves, so-called corrugated pipes, comprises a machine bed 1, on which half shells 2 and 2' are disposed, which are joined to each other, forming two so-called chains 3 and 3'. To this end, a bracket 5 is articulated by means of a pin 6 to each half shell 2 and 2' in the outward front portion thereof which leads in the direction of production 4; this bracket 5 is mounted on the succeeding half shell 2 in the corresponding place likewise by means of such a pin 6. By their rear end seen in the direction of production 4, the chains 3, 3' thus formed are guided along feed rollers 7 which serve as deflection wheels. Upon circulation of the chains 3, 3' in the direction of the arrows 8, 8', the individual half shells 2, 2' are moved into a molding path 9 where two half shells 2, 2' are united to form a pair; pairs of shells which are successive in the direction of production 4 lie close together. For rapid closing of the half shells 2, 2' into a parallel and adjoining position, so-called closing rollers 10 are provided, which accelerate the joining of the—in the direction production 4—rear ends of the half shells 2, 2'.

In the molding path 9 itself, the adjoining half shells 2, 2' are pressed against each other by means of guide rollers 11, which are mounted into guide rails 12 for rotation by means of rolling bearings. The feed rollers 7 are mounted on the machine bed 1 for rotation about axle ends 13.

At the front end, seen in the direction of production 4, of the machine bed 1, return rollers 14, which also serve as deflection wheels, are mounted for rotation about axle ends 15; the chains 3 and 3' are deflected by these return rollers 14 and guided back to the feed rollers 7. As seen in FIG. 1, the guide rails 12 with the guide rollers 11 terminate by the length of several half shells 2 and 2' before the return rollers 14 so that the half shells 2 and 2' can be moved apart parallel to each other and crosswise of the direction of production 4 prior to being deflected by the return rollers 14.

An indentation 16 is formed on the upper side of the half shells 2, 2', the two indentations 16 of the half shells 2, 2' which are allocated to each other in pairs being in alignment so that a common driving pinion 17 can engage with this indentation 16 from above, pushing the half shells 2, 2' in the molding path 9 as a closed mold through the molding path 9. Actuation of this driving pinion 17 takes place in the usual way by a motor (not shown) via a driving gear 18 which is non-rotatably fixed on a shaft 19, the shaft 19 again carrying the driving pinion 17. The shaft 19 is run in a bearing 20 which is supported on the machine bed by way of spacers 21 and joined thereto by means of fasteners 22.

The apparatus illustrated serves for the manufacture of corrugated plastic pipes 23 having a cross-groove profile, i.e. with cross grooves 24 which encircle over the periphery thereof, as they are used for instance as protecting tubes for electric cables. An extruder is provided to this end, only the extrusion head 25 of which is roughly outlined, extruding a tube (not shown) which, while still in a thermoplastic condition, arrives in the mold which is formed in the molding path 9 and in which the cross-groove profile is formed. So-called twin-wall pipes can be produced in the same way by this apparatus, which are externally similar to the pipe 23 and which are internally provided with a continuous smooth pipe.

The half shells 2, 2', which are allocated to each other in pairs, are cooled in the molding path 9; moreover, molding the cross grooves 24 takes place by vacuum actuation of the mold cavity 26 formed in the molding path 9. As far as described hereinbefore, the apparatus is known from U.S. Pat. No. 4,492,551.

Figure 2:
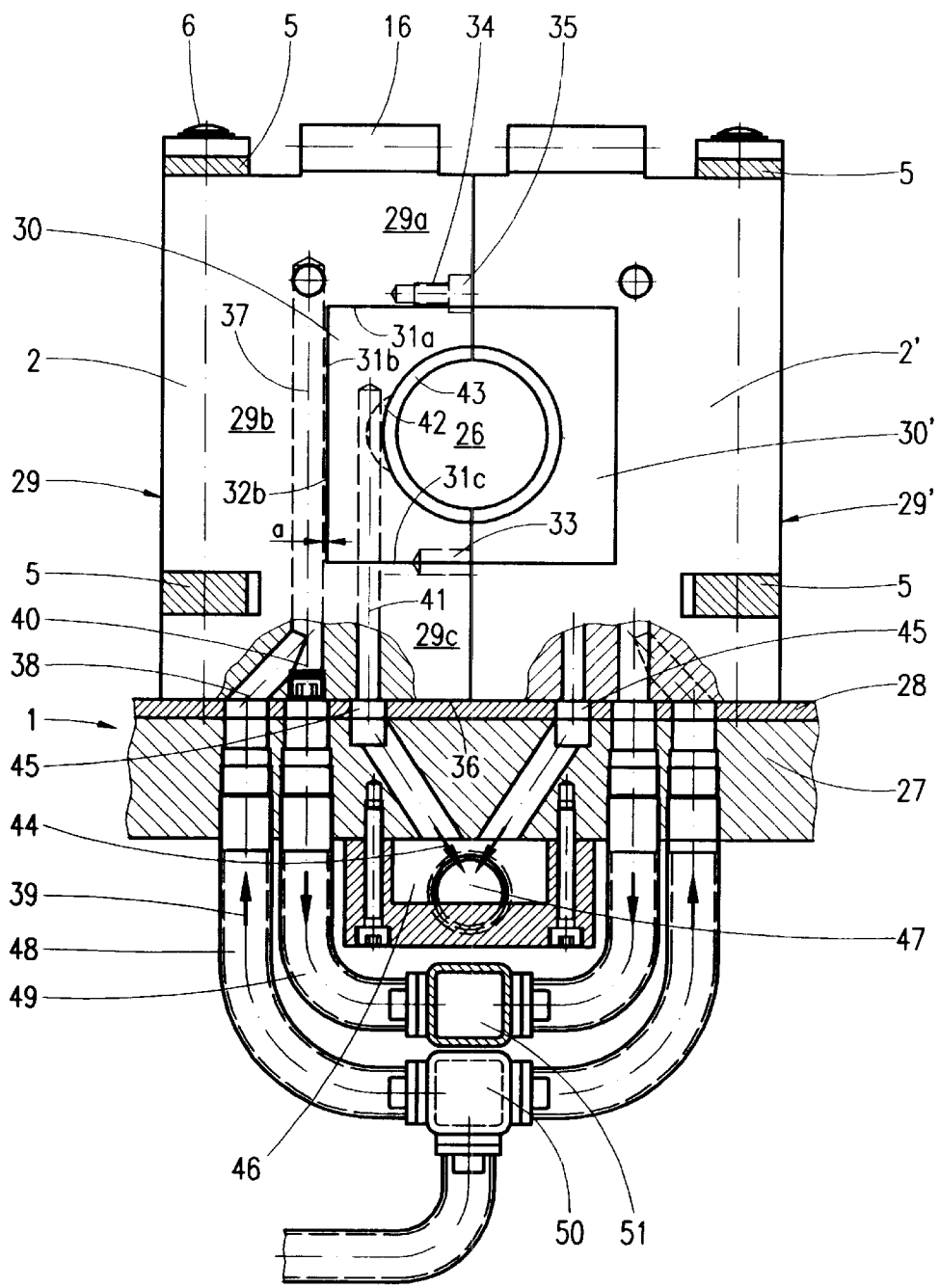
FIG. 2 is a frontal view of a pair of half shells of the apparatus according to the invention.
Figure 3:
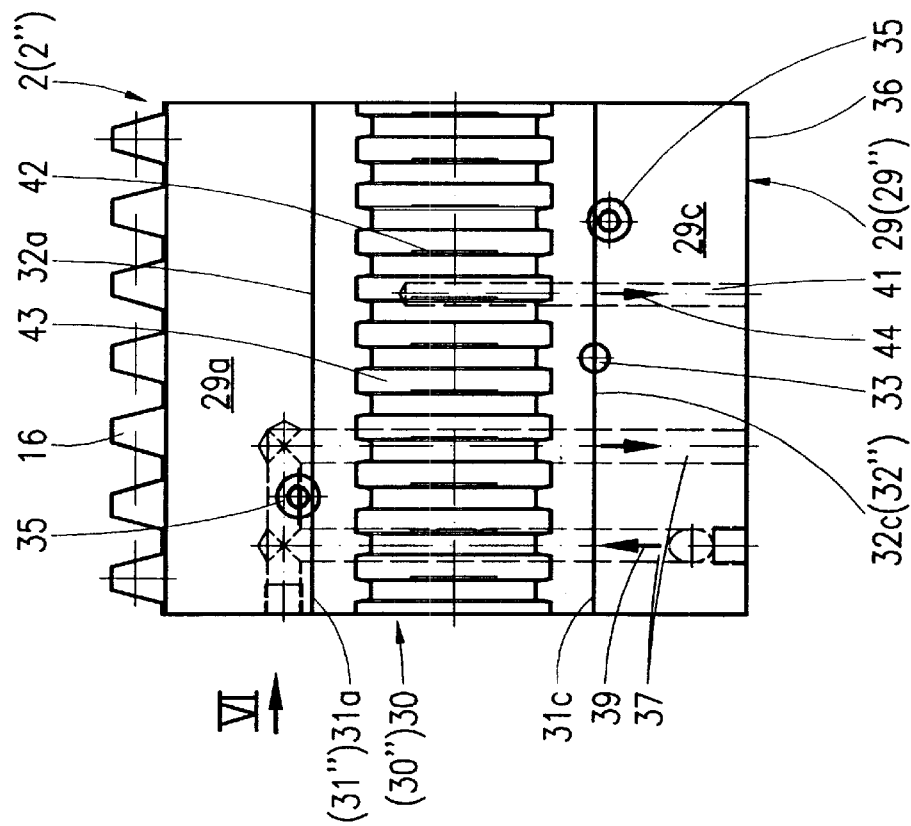
FIG. 3 is an interior view of the half shell according to FIG. 2.

As seen in FIG. 2, the machine bed 1 comprises a base plate 27 of steel and a cover plate 28 of an antifriction metal, for instance bronze, placed thereon. Each half shell 2, 2' comprises an outer base body 29, 29' of steel and a core 30, 30' of aluminum or an aluminun alloy. The core 30, 30' has plane outer surfaces 31a, 31b, 31c of as a rule rectangular arrangement, which rest over their full surface, i.e. tightly, on inner surfaces 32a, 32b, 32c of the base body 29 and 29' which define a recess that holds the core 30, 30', so that direct heat conduction may take place from the core 30, 30' to the base body 29, 29' via all the outer surfaces 31a, 31b, 31c and inner surfaces 32a, 32b, 32c. As seen in FIG. 2, each base body 29, 29' has the shape of a C. It has a horizontal upper leg 29a, a vertical web 29b and a horizontal lower leg which constitutes a lower plate 29c. As seen in FIGS. 2 and 3, the core 30, 30' is fixed in the direction of production 4 by means of a centering pin 33 which is disposed in the contact area between an outer surface 31c and an inner surface 32c. Fixing a core 30, 30' in the base body 29, 29' is effected by means of fasteners 34 which—as seen in FIG. 2—are screwed exclusively into the base body 29 and 29', only their head 35 engaging with the core 30, 30'.

The half shells 2, 2' rest on the cover plate 28 by their bearing surfaces 36 which are formed on the respective base body 29, 29'. Cooling water lines 37 extend from the cover plate 28 through the base body 29; they are formed by bores executed in the proximity of the vertical inner surface 32b. The water lines 37 are formed exclusively in the base body 29 and 29' at a very short distance a from the inner surface 32b. Cooling water is supplied to the water line 37 at the inlet 38; it flows through the water line 37 in the direction of flow 39 and emerges from the base body 29 and 29' at the outlet 40.

Vacuum ducts 41 extend from the bearing surface 36 upwards through the base body 29, 29' and the core 30, 30' as far as into the direct neighborhood of the mold cavity 26. From the vacuum ducts 41, numerous vacuum slits 42 open into the mold recesses 43 which are provided in the half shells 2, 2' for the formation of a mold cavity 26 and which have a shape complementary to the contour of the pipe 23. There is no need of a special seal between the outer surface 31c and the inner surface 32c in the vicinity of the respective vacuum ducts 41, since these surfaces rest tightly one upon the other and a small amount of misled air is of no importance in practice. The airflow direction in the vacuum ducts 41 is marked by the arrows 44. Vacuum connections 45 are provided in the machine bed 1, which the vacuum ducts 41 overlap in the molding path 9. These vacuum connections 45 open into a vacuum chamber 46 which is attached to the underside of the base plate 27 and into which opens a connection 47 of a vacuum pump (not shown).

In a comparable manner, the inlets 38 and the outlets 40 of the water lines 37 overlap cooling water connections 48 and corresponding cooling water outlets 49 formed in the machine bed 1. The water connections 48 are connected to a central cooling water inlet line 50 and the cooling water outlets 49 to a central cooling water outlet line 51.

For a change of mold, cores 30, 30' of identical outer dimensions can be used, which have varying mold cavities 26 and correspondingly varying mold recesses 43, the same base bodies 29, 29' being used.

In the embodiment according to FIGS. 4 and 5, a core 52 of aluminum, an aluminum alloy or any other suitable and excellently thermo-conducting material is available, which is greater as compared to the total cross-sectional surface of the respective half shell 2, 2' and which is provided with an indentation 16 on its upper outer surface 53a. The core 52 is sheathed by a base body 54 which is comprised of a plate 54b which forms a vertical web and of a lower plate 54c which forms a horizontal lower leg. As seen in FIG. 4, the base body 54 is of a two-piece design. In the same way as with the embodiment according to FIGS. 2 and 3, the base body 54 of the embodiment according to FIGS. 4 and 5 extends over the full length of a half shell 2, 2' so that half shells 2, 2' which adjoin in the direction of production 4 bear against each other by their base bodies 29, 29' and 54, respectively. The base bodies 29, 29' and 54 also extend as far as to the parting plane between two half shells 2, 2' of a shell pair.

The vertical web 54b and the lower plate 54c are united with the core 52 by means of dowel screws 55. Water lines 56 and vacuum ducts 57 run from the bearing surface 36 through the core 52, in this embodiment also the water lines 56 being formed substantially within the core 52. Consequently, a seal 58 must be provided between the lower plate 54c and the core 52.

With this embodiment, the entire half shells 2, 2' are replaced for a change of mold.

Figure 6:
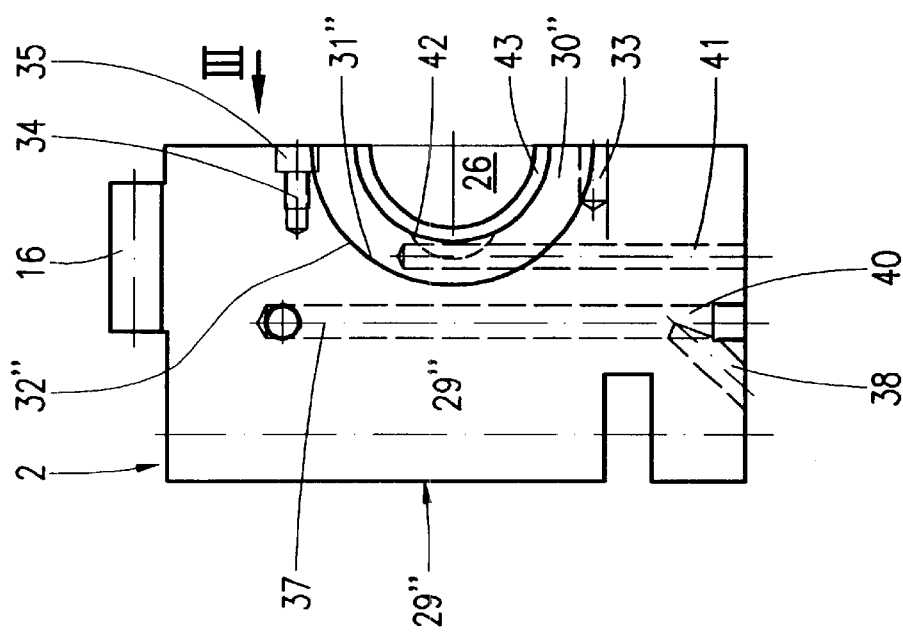
FIG. 6 is a frontal view of another modified embodiment of a half shell.

FIG. 6 illustrates an embodiment which is extraordinarily similar to that according to FIGS. 2 and 3 and to which fully applies the interior view according to FIG. 3. Therefore, in FIG. 3 the reference numerals newly introduced for FIG. 6 are put in brackets beside the reference numerals used for the embodiment according to FIGS. 2 and 3. As far as parts are identical, identical reference numerals are used. If the parts are functionally identical, but differ constructionally, the reference numerals of FIGS. 2 and 3 are used, however provided with a double prime.

The embodiment according to FIG. 6 differs from the embodiment according to FIGS. 2 and 3 by the outer base body 29" of steel having a core 30" of aluminum or an aluminum alloy which has a semi-cylindrical outer surface 31". Correspondingly, the recess in the base body 29" which holds the core 30" is defined by a semi-cylindrical inner surface 32" on which the core 30" rests over its full outer surface 31", i.e. by tight fit. The way in which the core 30" is fixed in the base body 29" and the otherwise design of the base body 29" and the core 30" corresponds to the embodiment according to FIGS. 2 and 3.

What is claimed is:

1. An apparatus for the manufacture of corrugated plastic pipes (23) with cross grooves (24), in which half shells (2,2'), which are provided with a mold recess (43) and combine in pairs to form a mold in a molding path (9) which runs in a direction of production (4). are disposed to circulate on a horizontal machine bed (1), which is provided with a cover plate (28) of antifriction metal; the half shells (2,2') resting by their lower bearing surfaces (36) on the cover plate (28) and being pressed together transversely of the direction of production (4) by means of a guide (11,12);

an extrusion head (25) of an extruder being disposed upstream of the molding path (9);

the half shells (2,2') being provided with vacuum ducts (41,57), which are connected to the respective mold recess (43) and which, in the molding path (9), open into vacuum connection (45) formed in the machine bed (1); and the half shells (2,2') being provided with coolant lines (37,56), which, in the molding path (9), open into vacuum connections (45) formed in the machine bed (1); and the half shells (2,2') being provided with coolant lines (37,56), which, in the molding path (9), open into coolant connections (48) and coolant outlets (49) formed in the machine bed (1), wherein each half shell (2,2') has a core (30,30',52,30"), which consists of a metal of higher thermal conductivity and a lower specific gravity than steel, in which the mold recess (43) is formed, in which the vacuum ducts (41,57) are formed at least substantially, and which is sheathed at least in the shape of an L by a base body (29, 29', 54, 29") of steel, on which the bearing surface (36) is formed and on which rests the guide (11,12).

2. An apparatus according to claim 1, wherein the core (30, 30', 52) is at least substantially provided with a rectangular cross section with outer surfaces (31a, 31b, 31c, 53a, 53b, 53c), on which rest inner surfaces (32a, 32b, 32c) of the base body (29, 29', 54).

3. An apparatus according to claim 1, wherein the base body (29, 29', 29") is formed in one piece.

4. An apparatus according to claim 3, wherein the base body (29, 29', 29") is approximately C-shaped and holds the core (30, 30').

5. An apparatus according to claim 1, wherein the coolant lines (37) are formed in the base body (29, 29', 29").

6. An apparatus according to claim 1, wherein the base body (54) is comprised of a lower plate (54c) and a vertical web (54b).

7. An apparatus according to claim 6, wherein the base body (54) is formed in two pieces.

8. An apparatus according to claim 1, wherein half shells (2, 2, 2', 2') which adjoin in the direction of production (4) in the molding path (9) bear against each other by their base bodies (29, 29, 29', 29', 54, 54).

9. An apparatus according to claim 1, wherein the half shells (2, 2') which combine in pairs to form a mold bear against each other by their base bodies (29, 29', 54, 54') in the molding path (9).

10. An apparatus according to claim 1, wherein the guide (11, 12) comprises guide rollers (11) mounted by means of rolling bearings.

11. An apparatus according to claim 1, wherein the core (30, 30', 52, 30") consists of aluminum or an aluminum alloy.

12. An apparatus according to claim 4, wherein the core (30") has a semi-cylindrical outer surface (31").

* * * * *